No. 613,477. Patented Nov. 1, 1898.
W. D. ROBINSON.
BACK PEDALING BRAKE.
(Application filed Sept. 3, 1897.)
(No Model.) 2 Sheets—Sheet 2.

WITNESSES:
F. C. Morley
E. L. Fullerton.

INVENTOR:
WILLIAM DUFFIELD ROBINSON,
By A. E. Paige, Atty.

THE NORRIS PETERS CO., PHOTO-LITHO., WASHINGTON, D. C.

UNITED STATES PATENT OFFICE.

WILLIAM DUFFIELD ROBINSON, OF PHILADELPHIA, PENNSYLVANIA.

BACK-PEDALING BRAKE.

SPECIFICATION forming part of Letters Patent No. 613,477, dated November 1, 1898.

Application filed September 3, 1897. Serial No. 650,442. (No model.)

*To all whom it may concern:*

Be it known that I, WILLIAM DUFFIELD ROBINSON, of Philadelphia, in the State of Pennsylvania, have invented certain new and useful Improvements in Bicycle-Brakes, whereof the following is a specification, reference being had to the accompanying drawings.

My invention relates to that class of brakes wherein the braking action is effected by reverse movement of the driving-gear.

It is the object of my improvements to provide brake mechanism which is not only efficient in operation but of simple construction and which may be readily attached upon or removed from a bicycle-frame.

Broadly speaking, my invention comprises a toothed member adapted for direct engagement with a driving-gear of a bicycle or similar vehicle, said toothed member being adapted for idle movement when said driving-gear is rotated in the normal direction, said member being, however, brought into operation to apply said brake when said driving-gear is rotated in the opposite direction.

Furthermore, my invention comprises such an arrangement of the parts that they may be maintained in an intermediate position, to permit coasting without application of power from said driving-gear, either to progress the bicycle or to apply said brake. In said intermediate position said parts are, however, so arranged that the rider may instantly assume control of the bicycle, either by rotation of said driving-gear in the direction to apply the brake, or, in the normal direction, to progress.

Figure 1:
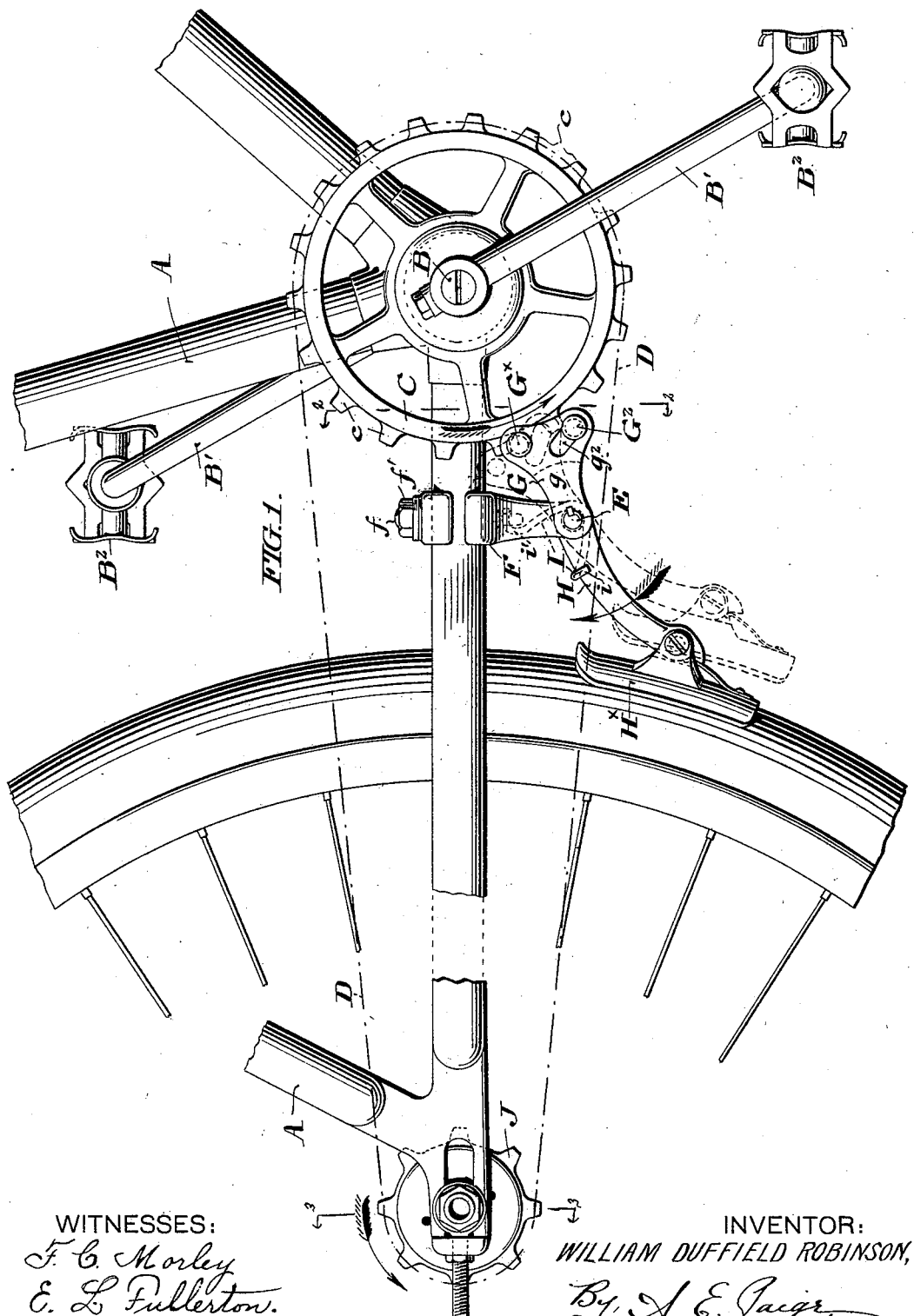
Figure 2:
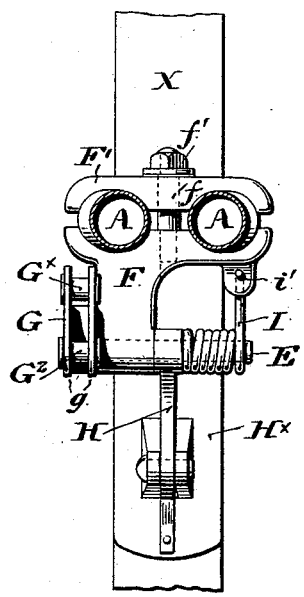
Figure 3:
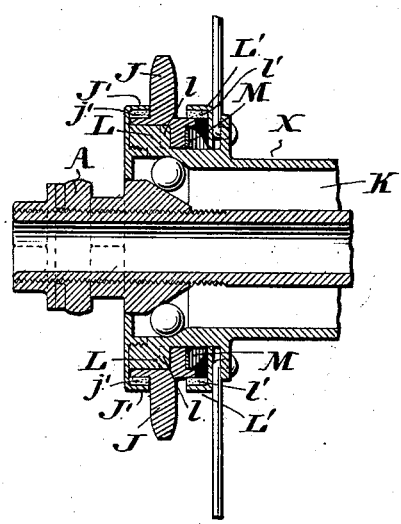
Figure 4:
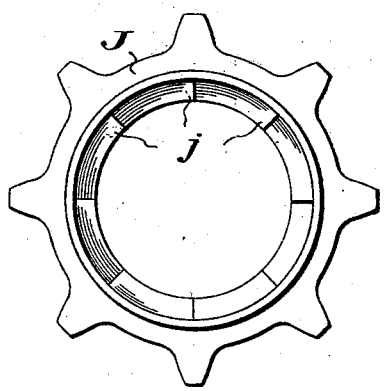

In the drawings, Figure 1 is a fragmentary side elevation of such portions of a bicycle-frame as suffice to show the application thereto of a convenient embodiment of my invention. Fig. 2 is a sectional view on the line 2 2 of Fig. 1. Fig. 3 is a sectional view on the line 3 3 of Fig. 1. Fig. 4 is a side elevation of the rear driven gear, showing its ratchet-teeth.

In said figures, A is the bicycle-frame; B, the crank-shaft; B' B', the driving-cranks, and $B^2 B^2$ the pedals. C is the driving-gear, rigidly mounted upon said crank-shaft B. Said driving-gear C is provided with teeth $c$, adapted to engage in the ordinary form of driving-chain, (indicated at D.)

E is a rock-shaft mounted in the clamp-bracket F and provided with the sector G and the brake-arm H in fixed relation therewith. The spring I is wrapped upon the shaft E and engaged at its extremity $i$ with said arm H and at its extremity $i'$ with said bracket F. Said spring serves to normally retain the brake out of contact with the wheel-tire in the position indicated in dotted lines in Fig. 1.

The sector G comprises a fixed tooth $G^\times$, which is in the normal position of the parts out of the path of travel of the driving-gear C. Said tooth $G^\times$ serves to receive the strain in the application of the brake. A second tooth $G^2$ is so mounted in the side plates $g\ g$ of the sector G as to be lifted and thrust aside to the inner extremity of the slots $g^2\ g^2$ by the rotation of the driving-gear in its normal direction. When, however, the driving-gear is rotated in the opposite direction, said tooth $G^2$, falling in said slots $g^2$ toward the driving-gear C, is engaged by the teeth $c$ and the sector deflected until the tooth $G^\times$ is engaged by the teeth $c$. Said tooth $G^2$ thus serves merely to place the tooth $G^\times$ in working engagement, and, as aforesaid, the strain of application of the brake $H^\times$ is borne by said tooth $G^\times$.

It being essential to the operation of this device that the driving-gear C shall be rotated in the direction opposite to its normal direction it is of course necessary to provide a disengaging-clutch in the driving-train in order that such action may take place without retrograde movement of the bicycle.

The aforesaid disengagement of the parts is conveniently effected by the device indicated in Fig. 1 and shown in detail in Figs. 3 and 4. The driven gear J is loosely mounted upon the hub K of the vehicle-wheel X, but is provided upon its inner face with ratchet-teeth $j$, adapted to engage with similar ratchet-teeth $l$ upon the ring L, which is fixed upon the wheel X, and thus drive the latter when the driving-gear C is rotated in the normal direction. When, however, the driven gear J is rotated in the opposite direction consequent upon the reversal of the driving-gear C in the application of the brake $H^\times$ or is held stationary for the purpose of coasting, said teeth $j$ are disengaged from the teeth $l$ and progression of the wheel X may occur independently of said driven gear J. To insure the instantaneous engagement of said teeth $k$ and $l$ upon the resumption of normal rotation of the parts, a spring M is provided, which tends to keep said teeth in engagement. The overhanging flanges J' L' and the felt washers $j'$ $l'$ (shown in section in Fig. 3) serve to prevent the access of dust to the above-described parts.

It is obvious from the foregoing description that the parts comprising the brake mechanism do not interfere with the ordinary running of the bicycle, the only member of said mechanism which comes in contact with the driving-gear during its normal operation being the roller-tooth $G^2$, which, as aforesaid, is thrust out of the path of travel of said driving-gear C by contact with the teeth $c$. If said mechanism is used solely for the application of the brake $H^\times$, the spring I may be dispensed with. In that event the mere resting of the operator's foot upon the bicycle-pedal may serve to reverse the relation of the parts and apply said brake $H^\times$. It is, however, desirable that the parts be adapted for an intermediate position, as aforesaid, wherein the operator may rest his feet upon the pedals in fixed position and allow the wheel to coast without application of the brake $H^\times$. The spring I is therefore so constructed as to sustain the desired weight. When, however, the operator so desires, but slight exertion is required to apply said brake against the action of said spring. In said intermediate position of the parts it is obvious that the wheel X may progress independently of the driving-gear C, chain D, and the driven gear J, which remain stationary, the ring L, carrying the teeth $l$, rotating freely past the teeth $j$ of the driven gear J without engagement therewith.

As indicated in Fig. 2, the clamp-bracket F is conveniently secured upon the frame A by means of a cap-piece F', which is securely clamped thereon by means of the threaded bolt $f$, upon which the nut $f'$ engages. It is obvious that the entire device may be conveniently removed from the frame A by releasing the nut $f'$.

Although it is essential that some means be provided to insure the disengagement of the driving-gear during the application of the brake, it is obviously not essential that the particular mechanism which I have illustrated be employed.

Although I have illustrated my invention as embodied in a bicycle of the ordinary chain-driven type, I do not desire to limit myself to such an embodiment of my invention, nor do I desire to limit myself to the precise construction which I have shown and described, as it is obvious that various modifications may be made without departing from the spirit of my invention.

I therefore claim—

1. In brake mechanism for vehicles, the combination with a gear of the vehicle driving mechanism, of a brake, mechanism connective of said gear and said brake, comprising a pivoted sector, positively engaged with the teeth of said gear by reverse movement of the latter, and means to render the vehicle driving mechanism inoperative during the operation of said brake, substantially as set forth.

2. In brake mechanism for vehicles, the combination with a gear of the vehicle driving mechanism, of a brake, mechanism connective of said gear and said brake, comprising a pivoted sector, an extensible tooth in said sector, adapted to engage said gear, and means to render the vehicle driving mechanism inoperative during the operation of said brake, substantially as set forth.

3. In brake mechanism for vehicles, the combination with a gear of the vehicle driving mechanism, of a brake, mechanism connective of said driving-gear and said brake, comprising a pivoted sector, composed of opposed slotted plates, a movable tooth mounted in the slots of said plates and adapted to engage said gear, and means to render the vehicle driving mechanism inoperative during the operation of said brake, substantially as set forth.

4. In brake mechanism for vehicles, the combination with a gear of the vehicle driving mechanism, of a brake provided with a sector, a tooth movable in said sector, means to effect the respective engagement and disengagement of the driving-gear and said movable tooth by rotation of said gear in one direction or the other, and means to render the vehicle driving mechanism inoperative during the engagement of said gear and sector-tooth, substantially as set forth.

5. In brake mechanism for vehicles, the combination with a gear of the vehicle driving mechanism, of a brake, provided with a sector, a tooth mounted for tangential movement in said sector, for normally idle engagement with said driving-gear, means to positively engage said tooth and gear by reverse rotation of the latter, and a clutch in the vehicle driving mechanism adapted for disengagement by said reverse movement of the driving-gear, substantially as set forth.

6. In brake mechanism for vehicles, the combination with a gear of the vehicle driving mechanism, of a brake, provided with a sector, a tooth movable in said sector, means to normally present said movable tooth for engagement with the driving-gear, a slot in said sector to permit the idle movement of said tooth by the normal rotation of said gear, means to positively engage said movable tooth and said gear by reverse rotation of the latter, and a clutch in the vehicle driving mechanism adapted for disengagement by said reverse movement of the driving-gear, substantially as set forth.

WILLIAM DUFFIELD ROBINSON.

Witnesses:
J. BONNER PETERSON,
C. H. EINERMAN.